United States Patent [19]
Krumwiede

[11] Patent Number: 6,103,650
[45] Date of Patent: *Aug. 15, 2000

[54] GREEN PRIVACY GLASS

[75] Inventor: John F. Krumwiede, Cheswick, Pa.

[73] Assignee: PPG Industries Ohio, Inc., Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/980,198

[22] Filed: Nov. 28, 1997

[51] Int. Cl.⁷ .............................. C03C 3/087; C03C 4/08
[52] U.S. Cl. .............................. 501/71; 501/64; 501/904; 501/905
[58] Field of Search .................. 501/64, 70, 71, 501/905, 904

[56] References Cited

U.S. PATENT DOCUMENTS

| | | | |
|---|---|---|---|
| 4,101,705 | 7/1978 | Fischer et al. | 428/220 |
| 4,104,076 | 8/1978 | Pons | 106/52 |
| 4,339,541 | 7/1982 | Dela Ruye | 501/71 |
| 4,381,934 | 5/1983 | Kunkle et al. | 65/135 |
| 4,792,536 | 12/1988 | Pecoraro et al. | 501/70 |
| 4,873,206 | 10/1989 | Jones | 501/71 |
| 4,886,539 | 12/1989 | Cerutti et al. | 65/135 |
| 5,023,210 | 6/1991 | Krumwiede et al. | 501/71 |
| 5,278,108 | 1/1994 | Cheng et al. | 501/71 |
| 5,308,805 | 5/1994 | Baker et al. | 501/71 |
| 5,346,867 | 9/1994 | Jones et al. | 501/71 |
| 5,352,640 | 10/1994 | Combes et al. | 501/71 |
| 5,393,593 | 2/1995 | Gulotta et al. | 428/220 |
| 5,411,922 | 5/1995 | Jones | 501/71 |
| 5,545,596 | 8/1996 | Casariego | 501/71 |
| 5,582,455 | 12/1996 | Casariego et al. | 501/71 |
| 5,650,365 | 7/1997 | Higby et al. | 501/71 |
| 5,688,727 | 11/1997 | Shelestak et al. | 501/70 |
| 5,700,579 | 12/1997 | Jeanvoine et al. | 428/437 |
| 5,728,471 | 3/1998 | Dupont et al. | 501/71 |
| 5,817,587 | 10/1998 | Jeanvoine et al. | 501/70 |
| 5,830,812 | 11/1998 | Shelestak et al. | 501/70 |

FOREIGN PATENT DOCUMENTS

| | | |
|---|---|---|
| 2148954 | 11/1995 | Canada . |
| 0 536 049 | 4/1993 | European Pat. Off. . |
| 0 644 164 | 3/1995 | European Pat. Off. . |
| 0 705 800 | 4/1995 | European Pat. Off. . |
| 0 802 168 | 10/1997 | European Pat. Off. . |
| 0 803 479 | 10/1997 | European Pat. Off. . |
| 0 816 296 | 1/1998 | European Pat. Off. . |
| 2 331 527 | 6/1977 | France . |
| 2289273 | 11/1995 | United Kingdom . |
| WO 96/00194 | 1/1995 | WIPO . |
| 99/47463 | 9/1999 | WIPO . |
| 99/58462 | 11/1999 | WIPO . |

*Primary Examiner*—Karl Group
*Attorney, Agent, or Firm*—Kenneth J. Stachel; Andrew C. Siminerio

[57] ABSTRACT

The present invention provides a green colored, infrared and ultraviolet absorbing glass composition having a luminous transmittance of up to 60 percent. The glass composition uses a standard soda-lime-silica glass base composition and additionally iron, cobalt, chromium, and titanium, as infrared and ultraviolet radiation absorbing materials and colorants. The glass of the present invention has a color characterized by a dominant wavelength in the range of about 480 to 510 nanometers, preferably about 490 to 525 nanometers, with an excitation purity of no higher than about 20%, preferably about 5 to 15%. In one embodiment of the invention, the glass composition of a green colored, infrared and ultraviolet radiation absorbing soda-lime-silica glass article includes a solar radiation absorbing and colorant portion consisting essentially of about 0.90 to 2.0 percent by weight total iron, about 0.17 to 0.52 percent by weight FeO, about 40 to 150 PPM CoO, about 250 to 800 PPM $Cr_2O_3$, and about 0.1 to 1 percent by weight $TiO_2$.

32 Claims, No Drawings

GREEN PRIVACY GLASS

BACKGROUND OF THE INVENTION

1. Field of the Invention

This invention relates to a tinted, green colored soda-lime-silica glass having a low luminous transmittance that makes it desirable for use as a privacy glazing in vehicles, such as the side and rear windows in vans. As used herein, the term "green colored" is meant to include glasses that have a dominant wavelength of about 480 to 510 nanometers (nm) and may also be characterized as green blue, green yellow, or green gray in color. In addition, the glass should exhibit lower infrared and ultraviolet radiation transmittance when compared to typical green glasses used in automotive applications and be compatible with float glass manufacturing methods.

2. Technical Considerations and Prior Art

Various dark tinted, infrared and ultraviolet radiation absorbing glass compositions are known in the art. The primary colorant in typical dark tinted automotive privacy glasses is iron, which is usually present in both the $Fe_2O_3$ and FeO forms. Some glasses use cobalt, selenium and, optionally, nickel in combination with iron to further control infrared and ultraviolet radiation and color, for example as disclosed in U.S. Pat. No. 4,873,206 to Jones; U.S. Pat. No. 5,278,108 to Cheng, et al.; U.S. Pat. No. 5,308,805 to Baker, et al.; U.S. Pat. No. 5,393,593 to Gulotta, et al.; U.S. Pat. No. 5,545,596 and U.S. Pat. No. 5,582,455 to Casariego, et al.; and European Patent application no. 0 705 800. Others also include chromium with this combination of colorants as disclosed in U.S. Pat. No. 4,104,076 to Pons; U.S. Pat. No. 4,339,541 to Dela Ruye; U.S. Pat. No. 5,023,210 to Krumwiede, et al; and U.S. Pat. No. 5,352,640 to Combes, et al.; European Patent application no. 0 536 049; French Patent 2,331,527 and Canadian Patent 2,148,954. Still, other glasses may include additional materials, such as disclosed in WO 96/00194, which teaches the inclusion of fluorine, zirconium, zinc, cerium, titanium and copper in the glass composition and requires that the sum of the alkaline earth oxides be less than 10 wt. % of the glass.

In producing infrared and ultraviolet radiation absorbing glasses, the relative amounts of iron and other additives must be closely monitored and controlled within an operating range to provide the desired color and spectral properties. It would be desirable to have a dark tinted green colored glass that may be used as a privacy glazing for vehicles to complement the green colored glasses typically used in automobiles and vans that exhibits superior solar performance properties and is compatible with commercial float glass manufacturing techniques.

SUMMARY OF THE INVENTION

The present invention provides a green colored, infrared and ultraviolet absorbing glass composition having a luminous transmittance of up to 60 percent. The glass uses a standard soda-lime-silica glass base composition and additionally iron, cobalt, chromium, and titanium, as infrared and ultraviolet radiation absorbing materials and colorants. The glass of the present invention has a color characterized by a dominant wavelength in the range of about 480 to 510 nanometers, preferably about 490 to 525 nanometers, with an excitation purity of no higher than about 20%, preferably about 5 to 15%.

In one embodiment of the invention, the glass composition of a green colored, infrared and ultraviolet radiation absorbing soda-lime-silica glass article includes a solar radiation absorbing and colorant portion consisting essentially of about 0.90 to 2.0 percent by weight total iron, about 0.17 to 0.52 percent by weight FeO, about 40 to 150 PPM CoO, about 250 to 800 PPM $Cr_2O_3$, and about 0.1 to 1 percent by weight $TiO_2$.

DETAILED DESCRIPTION OF THE INVENTION

The base glass of the present invention, that is, the major constituents of the glass without infrared or ultraviolet absorbing materials and/or colorants, which are an object of the present invention, is commercial soda-lime-silica glass characterized as follows:

|  | Weight Percent |
| --- | --- |
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |

As used herein, all "weight percent (wt. %)" values are based on the total weight of the final glass composition.

To this base glass, the present invention adds infrared and ultraviolet radiation absorbing materials and colorants in the form of iron, cobalt, chromium and titanium. As disclosed herein, iron is expressed in terms of $Fe_2O_3$ and FeO, cobalt is expressed in terms of CoO, chromium is expressed in terms of $Cr_2O_3$ and titanium is expressed in terms of $TiO_2$. It should be appreciated that the glass compositions disclosed herein may include small amounts of other materials, for example melting and refining aids, tramp materials or impurities. It should be further appreciated that in one embodiment of the invention, small amounts of additional materials may be included in the glass to improve the solar performance of the glass as will be discussed later in more detail.

The iron oxides in a glass composition perform several functions. Ferric oxide, $Fe_2O_3$, is a strong ultraviolet radiation absorber and operates as a yellow colorant in the glass. Ferrous oxide, FeO, is a strong infrared radiation absorber and operates as a blue colorant. The total amount of iron present in the glasses disclosed herein is expressed in terms of $Fe_2O_3$ in accordance with standard analytical practice but that does not imply that all of the iron is actually in the form of $Fe_2O_3$. Likewise, the amount of iron in the ferrous state is reported as FeO, even though it may not actually be present in the glass as FeO. In order to reflect the relative amounts of ferrous and ferric iron in the glass compositions disclosed herein, the term "redox" shall mean the amount of iron in the ferrous state (expressed as FeO) divided by the amount of total iron (expressed as $Fe_2O_3$). Furthermore, unless stated otherwise, the term "total iron" in this specification shall mean total iron expressed in terms of $Fe_2O_3$ and the term "FeO" shall mean iron in the ferrous state expressed in terms of FeO.

CoO operates as a blue colorant and a weak infrared radiation absorber in the glass. $Cr_2O_3$ may be added to impart a green color component to the glass composition. In addition, it is believed that the chromium may also provide some ultraviolet radiation absorption. $TiO_2$ is an ultraviolet radiation absorber that operates as a colorant imparting a yellow color to the glass composition. A proper balance between the iron, i.e. ferric and ferrous oxides, chromium, cobalt and titanium content is required to obtain the desired green colored privacy glass with the desired spectral properties.

The glass of the present invention may be melted and refined in a continuous, large-scale, commercial glass melting operation and formed into flat glass sheets of varying thickness by the float method in which the molten glass is supported on a pool of molten metal, usually tin, as it assumes a ribbon shape and is cooled in a manner well known in the art.

Although it is preferred that the glass disclosed herein be made using a conventional, overhead fired continuous melting operation, as is well known in the art, the glass may also be produced using a multi-stage melting operation, as disclosed in U.S. Pat. No. 4,381,934 to Kunkle, et al., U.S. Pat. No. 4,792,536 to Pecoraro, et al. and U.S. Pat. No. 4,886,539 to Cerutti, et al. If required, a stirring arrangement may be employed within the melting and/or forming stages of the glass production operation to homogenize the glass in order to produce glass of the highest optical quality.

Depending on the type of melting operation, sulfur may be added to the batch materials of a soda-lime-silica glass as a melting and refining aid. Commercially produced float glass may include up to about 0.3 wt. % $SO_3$. In a glass composition that includes iron and sulfur, providing reducing conditions may create amber coloration which lowers luminous transmittance as discussed in U.S. Pat. No. 4,792, 536 to Pecoraro, et al. However, it is believed that the reducing conditions required to produce this coloration in float glass compositions of the type disclosed herein are limited to approximately the first 20 microns of the lower glass surface contacting the molten tin during the float forming operation, and to a lesser extent, to the exposed upper glass surface. Because of the low sulfur content and the limited region of the glass in which any coloration could occur, depending on the particular soda-lime-silica-glass composition, sulfur in these surfaces has no material effect on the glass color or spectral properties.

It should be appreciated that as a result of forming the glass on molten tin as discussed above, measurable amounts of tin oxide may migrate into surface portions of the glass on the side contacting the molten tin. Typically, a piece of float glass has an $SnO_2$ concentration of at least 0.05 to 2 wt. % in about the first 25 microns below the surface of the glass that was in contact with the tin. Typical background levels of $SnO_2$ may be as high as 30 parts per million (PPM). It is believed that high tin concentrations in about the first 10 angstroms of the glass surface supported by the molten tin may slightly increase the reflectivity of that glass surface; however the overall impact on the glass properties is minimal.

Table 1 illustrates examples of experimental glass melts having glass compositions which embody the principles of the present invention. These experimental melts were analyzed to determine only the presence of iron, cobalt, chromium and titanium. Similarly, Table 2 illustrates a series of computer modeled glass compositions embodying the principles of the present invention. The modeled compositions were generated by a glass color and spectral performance computer model developed by PPG Industries, Inc. The spectral properties shown for Tables 1 and 2 are based on a reference thickness of 0.160 inches (4.06 mm). It should be appreciated that the spectral properties of the examples may be approximated at different thicknesses using the formulas disclosed in U.S. Pat. No. 4,792,536. Only the iron, cobalt, chromium and titanium portions of the examples are listed in the tables.

With respect to the transmittance data provided in Table 1, the luminous transmittance (LTA) is measured using C.I.E. standard illuminant "A" with a 2° observer over the wavelength range of 380 to 770 nanometers. Glass color, in terms of dominant wavelength and excitation purity, is measured using C.I.E. standard illuminant "C" with a 2° observer, following the procedures established in ASTM E308-90. The total solar ultraviolet transmittance (TSUV) is measured over the wavelength range of 300 to 400 nanometers, total solar infrared transmittance (TSIR) is measured over the wavelength range of 720 to 2000 nanometers, and total solar energy transmittance (TSET) is measured over the wavelength range of 300 to 2000 nanometers. The TSUV, TSIR and TSET transmittance data are calculated using Parry Moon air mass 2.0 direct solar irradiance data and integrated using the Trapezoidal Rule, as is known in the art. The spectral properties presented in Table 2 are based on the same wavelength ranges and calculation procedures.

Sample Preparation

The information provided in Table 1 is based on experimental laboratory melts having approximately the following batch components:

| | |
|---|---|
| cullet | 238.8 gm |
| sand | 329.6 gm |
| soda ash | 107.8 gm |
| limestone | 28.0 gm |
| dolomite | 79.4 gm |
| salt cake | 3.6 gm |
| $Fe_2O_3$ | as required |
| $Co_3O_4$ | as required |
| $Cr_2O_3$ | as required |
| $TiO_2$ | as required |

The raw materials were adjusted to produce a final glass weight of 700 gm. Reducing agents were added as required to control redox. The cullet used in the melts included 0.869 wt. % total iron, 8 PPM $Cr_2O_3$, and 0.218 wt. % $TiO_2$. In preparing the melts, the ingredients were weighed out and mixed. A portion of the raw batch material was then placed in a silica crucible and heated to 2450° F. (1343° C.). When the batch material melted down, the remaining raw materials were added to the crucible and the crucible was held at 2450° F. (1343° C.) for 30 minutes. The molten batch was then heated and held at temperatures of 2500° F. (1371° C.), 2550° F. (1399° C.), 2600° F. (1427° C.) for 30 minutes, 30 minutes and 1 hour, respectively. Next, the molten glass was fritted in water, dried and reheated to 2650° F. (1454° C.) in a platinum crucible for two hours. The molten glass was then poured out of the crucible to form a slab and annealed. Samples were cut from the slab and ground and polished for analysis.

The chemical analysis of the glass compositions (except for FeO) was determined using a RIGAKU 3370 X-ray fluorescence spectrophotometer. The spectral characteristics of the glass were determined on annealed samples using a Perkin-Elmer Lambda 9 UV/VIS/NIR spectrophotometer prior to tempering the glass or prolonged exposure to ultraviolet radiation, which will effect the spectral properties of the glass. The FeO content and redox was determined using the glass color and spectral performance computer model developed by PPG Industries, Inc.

The following is the approximate basic oxides of the experimental melts disclosed in Table 1 calculated based on the batch formulation, which fall within the base glass composition discussed earlier:

| | |
|---|---|
| $SiO_2$ | 71.9 wt. % |
| $Na_2O$ | 13.8 wt. % |
| CaO | 8.7 wt. % |
| MgO | 3.8 wt. % |
| $Al_2O_3$ | 0.12 wt. % |
| $K_2O$ | 0.037 wt. % |

It is expected that the basic oxide constituents of commercial soda-lime-silica glass compositions based on the experimental melts disclosed in Table 1 and the modeled compositions disclosed in Table 2 would be similar to those discussed earlier.

is preferred that the glass have a color characterized by a dominant wavelength (DW) in the range of about 480 to 510 nanometers (nm), preferably about 490 to 525 nanometers, and an excitation purity (Pe) of no higher than about 20%, preferably about 5 to 15%. Depending on the desired glass color, the dominant wavelength of the glass may preferably be within a narrower wavelength range. For example, it is contemplated that various embodiments of the glass composition may have a dominant wavelength in the range of 490 to 505 nanometers, 505 to 515 nanometers, or 515 to 525 nanometers as the desired color of the glass changes from green blue to green yellow. In one particular embodiment, the glasses include about 0.9 to 2.0 wt. % total iron, preferably 0.9 to 1.5 wt. % total iron, and more

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Total iron (wt. %) | 1.031 | 1.031 | 1.036 | 1.039 | 1.046 | 1.053 | 1.061 | 1.072 | 1.132 | 1.142 | 1.153 | 1.222 |
| FeO (wt. %) | 0.301 | 0.301 | 0.278 | 0.300 | 0.176 | 0.242 | 0.188 | 0.238 | 0.374 | 0.295 | 0.234 | 0.240 |
| Model redox | 0.292 | 0.292 | 0.268 | 0.289 | 0.166 | 0.230 | 0.177 | 0.222 | 0.331 | 0.259 | 0.203 | 0.196 |
| $Cr_2O_3$(PPM) | 525 | 527 | 528 | 528 | 489 | 471 | 516 | 476 | 525 | 517 | 568 | 493 |
| CoO(PPM) | 111 | 112 | 114 | 111 | 96 | 96 | 103 | 95 | 111 | 108 | 116 | 134 |
| $TiO_2$ (wt. %) | 0.182 | 0.181 | 0.183 | 0.183 | 0.290 | 0.237 | 0.302 | 0.236 | 0.249 | 0.247 | 0.247 | 0.339 |
| LTA (%) | 39.31 | 39.54 | 39.85 | 38.96 | 45.87 | 44.01 | 44.17 | 43.25 | 36.72 | 38.78 | 40.00 | 38.58 |
| TSUV (%) | 29.44 | 29.76 | 29.45 | 29.51 | 26.33 | 27.44 | 25.76 | 26.20 | 25.03 | 24.02 | 24.40 | 20.36 |
| TSIR (%) | 12.44 | 12.44 | 13.79 | 11.84 | 26.96 | 18.60 | 26.02 | 18.47 | 8.19 | 12.94 | 19.24 | 18.94 |
| TSET (%) | 25.54 | 25.66 | 26.53 | 25.07 | 35.53 | 30.48 | 34.29 | 30.00 | 21.74 | 25.16 | 28.97 | 27.43 |
| DW (nm) | 490.91 | 490.83 | 491.02 | 490.8 | 496.1 | 493.5 | 495.6 | 494.2 | 491.8 | 493.0 | 493.8 | 494.5 |
| Pe (%) | 15.26 | 15.27 | 14.81 | 15.47 | 8.85 | 11.11 | 9.52 | 10.87 | 15.32 | 13.22 | 11.88 | 9.92 |
| | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
| Total iron (wt. %) | 1.227 | 1.242 | 1.256 | 1.261 | 1.299 | 1.300 | 1.304 | 1.304 | 1.305 | 1.305 | 1.306 | 1.309 |
| FeO (wt. %) | 0.314 | 0.303 | 0.291 | 0.295 | 0.213 | 0.255 | 0.237 | 0.317 | 0.197 | 0.321 | 0.327 | 0.335 |
| Model redox | 0.256 | 0.244 | 0.232 | 0.234 | 0.164 | 0.196 | 0.182 | 0.243 | 0.151 | 0.246 | 0.250 | 0.256 |
| $Cr_2O_3$(wt. %) | 510 | 512 | 511 | 514 | 481 | 483 | 484 | 332 | 483 | 333 | 332 | 330 |
| CoO (wt. %) | 139 | 137 | 139 | 140 | 127 | 129 | 122 | 105 | 131 | 104 | 104 | 105 |
| $TiO_2$ (wt. %) | 0.344 | 0.345 | 0.345 | 0.345 | 0.314 | 0.314 | 0.316 | 0.314 | 0.318 | 0.314 | 0.314 | 0.3150 |
| LTA (%) | 33.67 | 34.06 | 34.24 | 34.05 | 38.27 | 36.36 | 38.02 | 38.87 | 38.34 | 38.98 | 38.90 | 38.14 |
| TSUV (%) | 20.02 | 19.64 | 19.49 | 19.40 | 18.32 | 18.29 | 18.12 | 18.80 | 18.11 | 18.90 | 18.98 | 18.78 |
| TSIR (%) | 11.55 | 12.37 | 13.31 | 12.99 | 21.36 | 16.60 | 18.44 | 11.92 | 23.46 | 11.58 | 11.29 | 10.66 |
| TSET (%) | 22.41 | 22.93 | 23.56 | 23.27 | 29.47 | 26.10 | 27.68 | 24.59 | 30.66 | 24.41 | 24.29 | 23.58 |
| DW (nm) | 491.2 | 491.5 | 491.6 | 491.6 | 494.2 | 493.1 | 494.6 | 492.5 | 494.1 | 492.6 | 492.4 | 492.1 |
| Pe (%) | 15.79 | 15.21 | 14.93 | 15.04 | 11.13 | 12.70 | 11.17 | 15.51 | 11.08 | 12.42 | 12.53 | 13.16 |

TABLE 2

| | Ex. 25 | Ex. 26 | Ex. 27 | Ex. 28 | Ex. 29 | Ex. 30 | Ex. 31 | Ex. 32 | Ex. 33 | Ex. 34 | Ex. 35 | Ex. 36 |
|---|---|---|---|---|---|---|---|---|---|---|---|---|
| Total iron (wt. %) | 1.450 | 1.500 | 1.540 | 1.540 | 1.650 | 1.650 | 1.700 | 1.850 | 1.850 | 1.900 | 1.900 | 2.000 |
| FeO (wt. %) | 0.371 | 0.384 | 0.396 | 0.394 | 0.422 | 0.422 | 0.435 | 0.473 | 0.473 | 0.486 | 0.486 | 0.512 |
| Model redox | 0.256 | 0.256 | 0.256 | 0.256 | 0.256 | 0.256 | 0.256 | 0.256 | 0.256 | 0.256 | 0.256 | 0.256 |
| $Cr_2O_3$(wt. %) | 750 | 500 | 650 | 725 | 650 | 700 | 685 | 7000 | 7000 | 510 | 510 | 510 |
| CoO (wt. %) | 70 | 65 | 70 | 80 | 65 | 65 | 66 | 57 | 65 | 55 | 65 | 45 |
| $TiO_2$ (wt. %) | 0.825 | 0.500 | 0.715 | 0.705 | 0.750 | 1.0 | 0.585 | 0.800 | 0.800 | 1.0 | 0.500 | 1.0 |
| LTA (%) | 38.22 | 41.07 | 38.31 | 36.267 | 37.87 | 37.26 | 37.03 | 36.52 | 35.46 | 37.89 | 36.83 | 38.29 |
| TSUV (%) | 15.13 | 16.12 | 14.60 | 14.54 | 13.28 | 12.42 | 13.29 | 11.21 | 11.20 | 10.44 | 11.81 | 9.70 |
| TSIR (%) | 7.99 | 7.77 | 7.12 | 7.02 | 6.07 | 6.01 | 5.61 | 4.51 | 4.51 | 4.37 | 4.36 | 3.80 |
| TSET (%) | 20.36 | 21.87 | 20.02 | 19.17 | 19.03 | 18.56 | 18.41 | 17.18 | 16.87 | 17.77 | 17.71 | 17.34 |
| DW (nm) | 522.0 | 509.6 | 516.15 | 513.8 | 519.9 | 525.3 | 518.2 | 527.6 | 523.2 | 525.1 | 511.7 | 530.7 |
| Pe (%) | 8.90 | 7.63 | 8.21 | 8.60 | 8.75 | 9.99 | 8.9 | 10.83 | 10.03 | 9.51 | 11.81 | 10.96 |

Referring to Tables 1 and 2, the present invention provides a green colored glass having a standard soda-lime-silica glass base composition and additionally iron, cobalt, chromium and titanium as infrared and ultraviolet radiation absorbing materials and colorants and a luminous transmittance (LTA) of no greater than 60%, preferably 25 to 55%, and more preferably 30 to 50%. In the present invention, it preferably about 1 to 1.4 wt. % total iron; about 0.17 to 0.52 wt. % FeO, preferably about 0.20 to 0.40 wt. % FeO, and more preferably about 0.24 to 0.35 wt. % FeO; about 40 to 150 PPM CoO, preferably about 50 to 140 wt. % CoO, and more preferably about 70 to 130 wt. % CoO; about 250 to 800 PPM $Cr_2O_3$, preferably about 250 to 600 PPM $Cr_2O_3$ and more preferably about 275 to 500 PPM $Cr_2O_3$; and about 0.1 to 1 wt. % TiO$_2$, preferably about 0.2 to 0.5 wt. % TiO$_2$. The redox ratio for these glasses is maintained between about 0.15 to 0.35, preferably between about 0.22 to 0.30, more preferably between about 0.24 to 0.28. These glass compositions also have a TSUV of no greater than about 35%, preferably no greater than about 30%; a TSIR of no greater than about 30%, preferably no greater than about 20%; and a TSET of no greater than about 40%, preferably no greater than about 35%.

It is expected that the spectral properties of the glass will change after tempering the glass and further upon prolonged exposure to ultraviolet radiation, commonly referred to as solarization. In particular, it is estimated that tempering and solarization of the glass compositions disclosed herein may reduce LTA and TSIR by about 0.5 to 1%, reduce the TSUV by about 1 to 2%, and TSET by about 1 to 1.5%. As a result, in one embodiment of the invention, the glass has selected spectral properties that initially fall outside the desired ranges previously discussed but fall within the desired ranges after tempering and/or solarization.

Glass as disclosed herein and made by the float process typically ranges from a sheet thickness of about 1 millimeter to 10 millimeters.

For vehicle glazing applications, it is preferred that the glass sheets having a composition and spectral properties as disclosed herein have a thickness within the range of 0.154 to 0.197 inches (3.9 to 5 mm). It is anticipated that when using a single glass ply, the glass will be tempered, e.g. for an automotive side or rear window.

It is also contemplated that the glass will have architectural applications and be used at thicknesses ranging from about 0.14 to 0.24 inches (3.6 to 6 mm).

Vanadium may be used as a partial or complete replacement for the chromium in the glass compositions of the present invention. More specifically, vanadium, which is expressed herein in terms of V$_2$O$_5$, imparts a yellow-green color to the glass and absorbs both ultraviolet and infrared radiation at different valence states. It is believed that Cr$_2$O$_3$ in the range of about 250 to 600 PPM discussed above may be completely replaced by about 0.1 to 0.32 wt. % V$_2$O$_5$.

As discussed earlier, other materials may also be added to the glass compositions disclosed herein to further reduce infrared and ultraviolet radiation transmission and/or control glass color. In particular, it is contemplated that the following materials may be added to the iron, cobalt, chromium and titanium containing soda-lime-silica glass disclosed herein:

| | |
|---|---|
| MnO$_2$ | 0 to 0.5 wt. % |
| Nd$_2$O$_3$ | 0 to about 0.5 wt. % |
| SnO$_2$ | 0 to 2 wt. % |
| ZnO | 0 to 0.5 wt. % |
| MoO$_3$ | 0 to 0.015 wt. % |
| CeO$_2$ | 0 to 2 wt. % |
| NiO | 0 to 0.1 wt. % |

As should be appreciated, adjustments may have to be made to the basic iron, cobalt, chromium and/or titanium constituents to account for any coloring and/or redox affecting power of these additional materials.

Other variations as are known to those skilled in the art may be resorted to without departing from the scope of the invention as defined by the claims that follow.

I claim:

1. A green colored, infrared and ultraviolet radiation absorbing glass composition having a composition comprising a base glass portion comprising:

| | |
|---|---|
| SiO$_2$ | about 66 to 75 percent by weight, |
| Na$_2$O | about 10 to 20 percent by weight, |
| CaO | about 5 to 15 percent by weight, |
| MgO | 0 to about 5 percent by weight, |
| Al$_2$O$_3$ | 0 to about 5 percent by weight, |
| K$_2$O | 0 to about 5 percent by weight, | and a solar radiation absorbing and colorant portion consisting essentially of:

| | |
|---|---|
| total iron | about 0.90 to 2.0 percent by weight, |
| FeO | about 0.17 to 0.52 percent by weight, |
| CoO | about 40 to 150 PPM, |
| Cr$_2$O$_3$ | about 250 to 800 PPM, and |
| TiO$_2$ | about 0.1 to 1 percent by weight, | the glass having a luminous transmittance (LTA) of up to about 60 percent at a thickness of 0.160 inches.

2. The composition as in claim 1 wherein the total iron concentration is from about 0.9 to 1.5 weight percent, the FeO concentration is about 0.20 to 0.40 weight percent, the CoO concentration is about 50 to 140 PPM, and the Cr$_2$O$_3$ concentration is about 250 to 600 PPM.

3. The composition as in claim 2 wherein the total iron concentration is from about 1.0 to 1.4 weight percent, the FeO concentration is about 0.24 to 0.35 weight percent, the CoO concentration is about 70 to 130 PPM, the Cr$_2$O$_3$ concentration is about 275 to 500 PPM, and the TiO$_2$ concentration is about 0.2 to 0.5 weight percent.

4. The composition as in claim 3 wherein the glass has a luminous transmittance (LTA) of about 25 to 55 percent, a total solar ultraviolet transmittance (TSUV) of about 35 percent or less, a total solar infrared transmittance (TSIR) of about 30 percent or less and a total solar energy (TSET) transmittance of about 40 percent or less, and the color of the glass is characterized by a dominant wavelength in the range of about 480 to 530 nanometers and an excitation purity of no higher than about 20 percent at a thickness of 0.160 inches.

5. The composition as in claim 4 wherein the glass has a luminous transmittance (LTA) of about 30 to 50 percent, a total solar ultraviolet transmittance (TSUV) of about 30 percent or less, a total solar infrared transmittance (TSIR) of about 20 percent or less and a total solar energy transmittance (TSET) of about 35 percent or less, and the color of the glass is characterized by a dominant wavelength in the range of about 490 to 525 nanometers and an excitation purity of about 5 to 15 percent.

6. The composition as in claim 1 wherein the glass has a redox of about 0.15 to 0.35.

7. The composition as in claim 6 wherein the glass has a redox of about 0.22 to 0.30.

8. The composition as in claim 1 wherein the glass has a total solar ultraviolet transmittance (TSUV) of about 35 percent or less, a total solar infrared transmittance (TSIR) of about 30 percent or less and a total solar energy transmittance (TSET) of about 40 percent or less.

9. The composition as in claim 8 wherein the glass has a total solar ultraviolet transmittance (TSUV) of about 30 percent or less, a total solar infrared transmittance (TSIR) of about 20 percent or less and a total solar energy transmittance (TSET) of about 35 percent or less.

10. The composition as in claim 1 wherein the color of the glass is characterized by a dominant wavelength in the range of about 480 to 510 nanometers and an excitation purity of no higher than about 20 percent.

11. The composition as in claim 7 wherein the color of the glass is characterized by a dominant wavelength in the range of about 490 to 525 nanometers and an excitation purity of about 5 to 15 percent.

12. The composition as in claim 1 wherein the glass has a luminous transmittance (LTA) of about 25 to 55 percent.

13. The composition as in claim 12 wherein the glass has a luminous transmittance (LTA) of about 30 to 50 percent.

14. A flat glass sheet formed by the float process from the glass composition recited in claim 1.

15. An automotive window formed from the flat glass sheet of claim 14.

16. A green colored, infrared and ultraviolet radiation absorbing glass composition having a composition comprising a base glass portion comprising:

| | |
|---|---|
| $SiO_2$ | about 66 to 75 percent by weight, |
| $Na_2O$ | about 10 to 20 percent by weight, |
| CaO | about 5 to 15 percent by weight, |
| MgO | 0 to about 5 percent by weight, |
| $Al_2O_3$ | 0 to about 5 percent by weight, |
| $K_2O$ | 0 to about 5 percent by weight, | and a solar radiation absorbing and colorant portion consisting essentially of:

| | |
|---|---|
| total iron | about 0.90 to 2.0 percent by weight, |
| FeO | about 0.17 to 0.52 percent by weight, |
| CoO | about 40 to 150 PPM, |
| $Cr_2O_3$ | about 250 to 800 PPM, |
| $TiO_2$ | about 0.1 to 1 percent by weight, |
| $V_2O_5$ | about 0.1 to 0.32 percent by weight, |
| $MnO_2$ | 0 to about 0.5 percent by weight, |
| $Nd_2O_3$ | 0 to about 0.5 percent by weight, |
| $SnO_2$ | 0 to about 2 percent by weight, |
| ZnO | 0 to about 0.5 percent by weight, |
| $MoO_3$ | 0 to about 0.015 percent by weight, |
| $CeO_2$ | 0 to about 2 percent by weight, and |
| NiO | 0 to about 0.1 percent by weight, | the glass having a luminous transmittance (LTA) of up to about 60 percent.

17. The composition as in claim 16 wherein the glass has a total solar ultraviolet transmittance (TSUV) of about 35 percent or less, a total solar infrared transmittance (TSIR) of about 30 percent or less and a total solar energy transmittance (TSET) of about 40 percent or less.

18. The composition as in claim 16 wherein the color of the glass is characterized by a dominant wavelength in the range of about 480 to 510 nanometers and an excitation purity of no higher than about 20 percent.

19. The composition as in claim 16 wherein the glass has a total solar ultraviolet transmittance (TSUV) of about 30 percent or less, a total solar infrared transmittance (TSIR) of about 20 percent or less and a total solar energy transmittance (TSET) of about 35 percent or less, and the color of the glass is characterized by a dominant wavelength in the range of about 490 to 525 nanometers and an excitation purity of about 5 to 15 percent.

20. The composition as in claim 19 wherein the total iron concentration is from about 1.0 to 1.4 weight percent, the FeO concentration is about 0.24 to 0.35 weight percent, the CoO concentration is about 70 to 130 PPM, the $Cr_2O_3$ concentration is about 275 to 500 PPM, and the $TiO_2$ concentration is about 0.2 to 0.5 weight percent.

21. A flat glass sheet formed by the float process from the glass composition recited in claim 15.

22. The composition as in claim 1 which includes materials selected from the group of: melting and refining aids, tramp materials, and impurities.

23. The composition as in claim 1 which includes sulfur.

24. The composition as in claim 23 wherein the sulfur is in the form of $SO_3$ in an amount up to about 0.3 wt%.

25. The composition as in claim 23 wherein the sulfur along with the iron under reducing conditions to produce the glass composition creates amber coloration which lowers luminous transmittance.

26. The composition as in claim 25 wherein the glass composition is flat glass sheet formed by the float process and the sulfur and iron production of amber coloration occurs to approximately the first 20 microns of the lower glass surface of the sheet that contacted the molten tin during the float formation and to a lesser extent in the exposed upper glass surface of the sheet.

27. The composition as in claim 16 which includes materials selected from the group of: melting and refining aids, tramp materials, and impurities.

28. The composition as in claim 16 which includes sulfur.

29. The composition as in claim 28 wherein the sulfur is in the form of $SO_3$ in an amount up to about 0.3 wt%.

30. The composition as in claim 28 wherein the sulfur along with the iron under reducing conditions to produce the glass composition creates amber coloration which lowers luminous transmittance.

31. The composition as in claim 30 wherein the glass composition is flat glass sheet formed by the float process and the sulfur and iron production of amber coloration occurs to approximately the first 20 microns of the lower glass surface of the sheet that contacted the molten tin during the float formation and to a lesser extent in the exposed upper glass surface of the sheet.

32. The composition as in claim 16 wherein the glass composition is flat glass sheet formed by the float process and the $SnO_2$ concentration is in about the first 25 microns below the surface of the glass that was in contact with the tin during formation of the flat glass in the float process.

* * * * *